Feb. 6, 1923.
J. H. LIDHOLM.
METHOD OF PRODUCING A SOLUTION OF CYANAMIDE FROM CALCIUM CYANAMIDE.
FILED JAN. 10, 1922.
1,444,256.
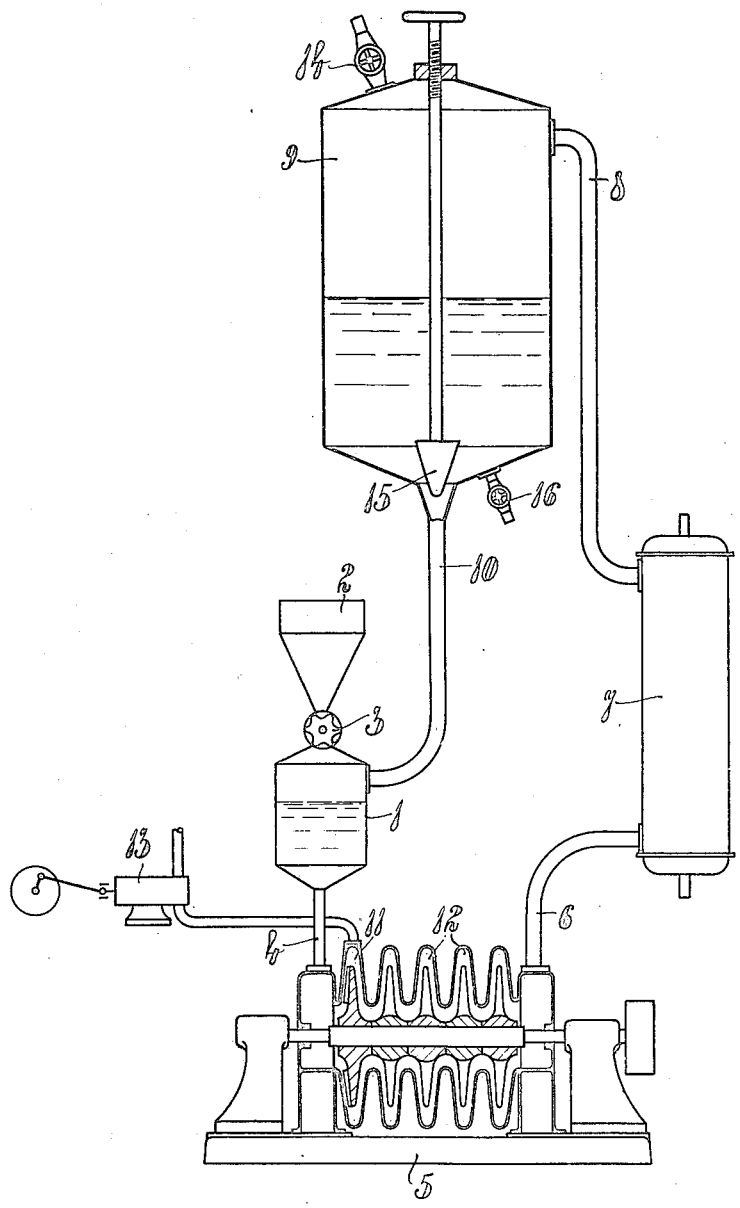

Patented Feb. 6, 1923.

1,444,256

UNITED STATES PATENT OFFICE.

JOHAN HJALMAR LIDHOLM, OF WARGON, SWEDEN.

METHOD OF PRODUCING A SOLUTION OF CYANAMIDE FROM CALCIUM CYANAMIDE.

Application filed January 10, 1922. Serial No. 528,130.

*To all whom it may concern:*

Be it known that I, JOHAN HJALMAR LIDHOLM, a citizen of the Kingdom of Sweden, residing at Wargon, Sweden, have invented new and useful Improved Methods of Producing a Solution of Cyanamide from Calcium Cyanamide, of which the following is a specification.

In my copending application Ser. No. 449565 I have described a method of producing concentrated solutions of cyanamide in such manner that crude calcium cyanamide is successively supplied to water or a weak solution of cyanamide while carbon dioxide is simultaneously supplied for precipitating the calcium as calcium carbonate. The process is carried out in such manner that the reaction mixture is maintained in a continuous circulation by means of a pumping and beating apparatus to which the carbon dioxide is supplied and is brought in intimate contact with the calcium cyanamide dissolved or suspended in the water. The supply of the calcium cyanamide is performed with a regulated speed in a tank from which the solution flows to the pumping and beating apparatus wherein it is saturated by the carbon dioxide, the solution passing then, if necessary, through a cooler and then back to the tank in a continuous circulation.

As the calcium cyanamide is supplied the total volume of the solution and the solid particles contained therein is increased and it is, therefore, necessary to use a rather large supply tank which can take up the increase. The quantity of solution contained in said tank is accordingly continuously increased during the performance of the operation, and accordingly the more concentrated the solution will be the longer time is required ere the fresh supply of calcium cyanamide will be neutralized by the carbon dioxide. Under unfavorable circumstances it may, therefore, happen that a considerable polymerization of the cyanamide into dicyandiamide takes place in the supply tank.

The object of the present invention is to avoid said drawback by carrying out the operation in such maner that the supply of fresh calcium cyanamide is always in a very short time carried over to the point of the system where the carbon dioxide is added.

The invention consists chiefly in maintaining the quantity of solution between the point where the calcium cyanamide is added and the point where the carbon dioxide is supplied essentially unaltered and small in relation to the whole quantity of circulating liquid, and storing the increase of the solution caused by the successive addition of the calcium cyanamide at a point in the system in front of the point where the calcium cyanamide is added to the circulating solution. By carrying out the operation in this manner the effect is obtained that the fresh calcium cyanamide practically instantaneously is carried over to the point where the calcium is precipitated as calcium carbonate so that the solution will be alkaline only for a very short period of time.

In the accompanying drawing I have shown diagrammatically one embodiment of an apparatus for carrying the process into practice.

Referring to the drawing, 1 designates a tank or vessel the volume of which is rather small in comparison with the volume of the whole apparatus. 2 is a hopper through which the calcium cyanamide to be treated is supplied, a rotary star wheel 3 being provided at the lower end of the hopper to gradually feed the calcium cyanamide into the vessel. The vessel 1 communicates through a pipe 4 with the suction side of a combined pumping and beating apparatus 5 the delivering side of which is through a pipe 6 connected with a cooler 7 from which a pipe 8 is leading to the upper part of a tank 9 which at the bottom is connected with a vessel 1 through a pipe 10. The first compartment of the pumping and beating device 5 contains a wing wheel 11 and is constructed as an ordinary centrifugal pump while the other compartments only contain wheels 12 having stirring or beating arms for effecting a stirring operation only but no pumping action. 13 is a pump for introducing carbon dioxide or gases containing carbon dioxide under pressure into the circulation system immediately behind the pump wheel 11. The pipe 8 should preferably be tangentially connected to the tank 9 so that the gases following the entering solution are separated from the latter by centrifugal action whereupon they escape through the outlet pipe 14. The flow of the solution from the tank 9 to the vessel 1 may be regulated by means of a regulating valve 15 provided in the outlet at the bottom of the tank 9. 16 is a bottom valve for drawing off the content of the tank 9 when the operation has been finished.

The operation of the apparatus described is as follows: The tank 9 is filled to a suitable height with water or a weak solution of cyanamide which has been obtained by washing the solid residue or mud from a preceding operation, and the hopper 2 is filled with calcium cyanamide. The valve 15 is then opened so that the vessel 1 is partly filled and at the same time the pumping and beating device, the star wheel 3 and the pump 13 are started. The solution is thus brought continuously to circulate through the system and the valve 15 is so regulated that the level of the liquid in the vessel 1 remains practically constant. The increase of the volume which is caused by the calcium cyanamide supplied is taken up by the tank 9 in which the level accordingly raises during the operation. On account of the fact that the vessel 1 has a small volume as compared with the volume of the whole system and the capacity of the pump 5 is constant any particle of freshly supplied calcium cyanamide is in a very short time forwarded to the point where it is neutralized by the carbon dioxide and the supply of calcium cyanamide can, therefore, take place rather speedy without risk of a too great polymerization of the solution. Even if the solution in the vessel 1 would be rather strongly alkaline, the cyanamide will only to a small degree be polymerized on account of the very short time between the supply of the calcium cyanamide and the neutralization of the solution by the carbon dioxide.

When the solution has reached the desired degree of concentration the tank 9 is emptied and then a further quantity of water or weak solution of cyanamide is added whereupon the process can be immediately continued so that the operation will be practically continuous.

What I claim is:—

1. Method of producing a solution of cyanamide practically free from dicyandiamide, comprising continuously circulating a water solution of cyanamide, and gradually supplying to the solution calcium cyanamide at one point and carbon dioxide at another point of the circulation system while maintaining the quantity of liquid between said points practically constant and small in relation to the total quantity of the liquid used.

2. Method of producing a solution of cyanamide practically free from dicyandiamide comprising continuously circulating a water solution of cyanamide, gradually supplying to the solution calcium cyanamide and carbon dioxide, and maintaining the quantity of liquid practically constant between the points where the calcium cyanamide and the carbon dioxide respectively are supplied by taking up the increase of volume caused by the calcium cyanamide supplied in a container in front of the point where the calcium cyanamide is supplied.

In testimony whereof I have signed my name.

JOHAN HJALMAR LIDHOLM,